US009171317B2

(12) United States Patent
Kaplan et al.

(10) Patent No.: US 9,171,317 B2
(45) Date of Patent: Oct. 27, 2015

(54) BACK-CHANNEL MEDIA DELIVERY SYSTEM

(75) Inventors: Robert E. Kaplan, Mercer Island, WA (US); Stuart Graham, Kenmore, WA (US); Mars Tanumihardja, Seattle, WA (US); Ajay Arora, Boston, MA (US); Johann Garcia, Seattle, WA (US)

(73) Assignee: Vulcan IP Holdings, Inc., Seattle, WA (US)

( * ) Notice: Subject to any disclaimer, the term of this patent is extended or adjusted under 35 U.S.C. 154(b) by 1056 days.

(21) Appl. No.: 11/981,636

(22) Filed: Oct. 30, 2007

(65) Prior Publication Data
US 2008/0183560 A1 Jul. 31, 2008

Related U.S. Application Data (60) Provisional application No. 60/898,855, filed on Jan. 31, 2007.

(51) Int. Cl.
*G06Q 30/00* (2012.01)
*G06Q 30/02* (2012.01)

(52) U.S. Cl.
CPC ............ *G06Q 30/0241* (2013.01); *G06Q 30/02* (2013.01); *G06Q 30/0201* (2013.01); *G06Q 30/0205* (2013.01); *G06Q 30/0207* (2013.01); *G06Q 30/0242* (2013.01); *G06Q 30/0256* (2013.01); *G06Q 30/0258* (2013.01); *G06Q 30/0273* (2013.01); *G06Q 30/0277* (2013.01)

(58) Field of Classification Search
USPC ................................ 705/14.4, 14.41; 382/209
See application file for complete search history.

(56) References Cited

U.S. PATENT DOCUMENTS

| | | | |
|---|---|---|---|
| 5,740,549 A | 4/1998 | Reilly et al. | |
| 5,841,987 A | 11/1998 | Blatter et al. | ............ 395/200.66 |
| 5,854,887 A * | 12/1998 | Kindell et al. | .................. 725/86 |
| 5,973,683 A | 10/1999 | Cragun et al. | ................ 345/327 |
| 5,974,398 A | 10/1999 | Hanson et al. | |
| 5,995,134 A | 11/1999 | Hayashi | |
| 6,152,563 A | 11/2000 | Hutchinson et al. | |
| 6,526,335 B1 | 2/2003 | Treyz et al. | |

(Continued)

FOREIGN PATENT DOCUMENTS

| | | |
|---|---|---|
| JP | 2005293491 A | 10/2005 |
| WO | 0241262 A1 | 5/2002 |
| WO | WO 03/343336 | 5/2003 |

OTHER PUBLICATIONS

International Search Report and Written Opinion in International Application No. PCT/US2008/052511 mailed on Jun. 10, 2008.

(Continued)

*Primary Examiner* — Tsan-Yu J Huang
(74) *Attorney, Agent, or Firm* — Dorsey & Whitney LLP (57) ABSTRACT

A back-channel media delivery system that may be used for tracking the number and type of human impressions of media content rendered by the system during the time the media was rendered is provided. The back-channel media delivery system includes a rendering device for rendering media, an environmental sensor for sensing impressions and other environmental variables and a computing device configured to play media on the rendering device, and gather data related to the external states detected by the environmental sensor. The system may include rules that interpret that data and may cause the system to custom select, tailor or control future playback of media on the system.

32 Claims, 7 Drawing Sheets

(56) References Cited

U.S. PATENT DOCUMENTS

| | | | |
|---|---|---|---|
| 6,542,185 B1 * | 4/2003 | Bogardus | 348/223.1 |
| 6,574,793 B1 | 6/2003 | Ngo et al. | 725/32 |
| 6,631,356 B1 | 10/2003 | Van Horn et al. | 705/26 |
| 6,645,078 B1 | 11/2003 | Mattice | |
| 6,904,408 B1 | 6/2005 | McCarthy et al. | 705/2 |
| 6,968,565 B1 | 11/2005 | Slaney et al. | 725/10 |
| 7,027,054 B1 | 4/2006 | Cheiky et al. | 345/473 |
| 7,187,786 B2 * | 3/2007 | Kee | 382/118 |
| 7,302,475 B2 | 11/2007 | Gold et al. | 709/217 |
| 7,316,025 B1 | 1/2008 | Aijala et al. | |
| 7,319,779 B1 | 1/2008 | Mummareddy et al. | 382/118 |
| 7,340,439 B2 | 3/2008 | Burger et al. | |
| 7,364,068 B1 | 4/2008 | Strubbe et al. | 235/376 |
| 7,440,674 B2 | 10/2008 | Plotnick et al. | |
| 7,505,621 B1 | 3/2009 | Agrawal et al. | 382/159 |
| 7,574,727 B2 | 8/2009 | Nathan et al. | 725/100 |
| 7,584,150 B2 | 9/2009 | Hirotsune et al. | 705/52 |
| 7,584,353 B2 | 9/2009 | Risan et al. | 713/164 |
| 7,664,124 B2 | 2/2010 | Alston et al. | 370/401 |
| 7,895,076 B2 * | 2/2011 | Kutaragi et al. | 705/14.41 |
| 2002/0062481 A1 | 5/2002 | Slaney et al. | 725/42 |
| 2002/0065046 A1 | 5/2002 | Mankins et al. | |
| 2002/0111146 A1 | 8/2002 | Fridman et al. | |
| 2002/0112171 A1 * | 8/2002 | Ginter et al. | 713/185 |
| 2002/0125993 A1 | 9/2002 | Gutta et al. | 340/5.52 |
| 2003/0060897 A1 | 3/2003 | Matsuyama et al. | |
| 2003/0088832 A1 | 5/2003 | Agostinelli et al. | 715/526 |
| 2003/0126013 A1 | 7/2003 | Shand | 705/14 |
| 2004/0003393 A1 | 1/2004 | Gutta et al. | 725/25 |
| 2004/0073482 A1 | 4/2004 | Wiggins et al. | |
| 2004/0093264 A1 | 5/2004 | Shimizu | |
| 2004/0111360 A1 | 6/2004 | Albanese | 705/38 |
| 2004/0128198 A1 * | 7/2004 | Register et al. | 705/14 |
| 2005/0038749 A1 * | 2/2005 | Fitch et al. | 705/51 |
| 2005/0149396 A1 | 7/2005 | Horowitz et al. | |
| 2005/0171897 A1 | 8/2005 | Forsythe et al. | |
| 2005/0288954 A1 | 12/2005 | McCarthy et al. | 705/1 |
| 2006/0093998 A1 | 5/2006 | Vertegaal | |
| 2006/0100980 A1 | 5/2006 | Reed et al. | 707/1 |
| 2006/0117341 A1 | 6/2006 | Park | 725/34 |
| 2006/0136294 A1 * | 6/2006 | Linden et al. | 705/14 |
| 2006/0147192 A1 | 7/2006 | Zhang et al. | 396/263 |
| 2006/0170670 A1 | 8/2006 | Burke | |
| 2006/0174261 A1 | 8/2006 | Cline, Jr. et al. | 725/20 |
| 2006/0188109 A1 | 8/2006 | Makino et al. | 381/86 |
| 2006/0282465 A1 | 12/2006 | Sharma | 707/104.1 |
| 2007/0073579 A1 * | 3/2007 | Immorlica et al. | 705/14 |
| 2007/0073585 A1 | 3/2007 | Apple et al. | |
| 2007/0073589 A1 | 3/2007 | Vergeyle et al. | 705/14 |
| 2007/0089125 A1 | 4/2007 | Claassen | 725/9 |
| 2007/0105536 A1 | 5/2007 | Tingo | |
| 2007/0124157 A1 | 5/2007 | Laumeyer et al. | |
| 2007/0150340 A1 | 6/2007 | Cartmell | 705/14 |
| 2007/0155497 A1 | 7/2007 | Okada | |
| 2007/0179852 A1 | 8/2007 | Martin et al. | |
| 2007/0198334 A1 | 8/2007 | Mebruer | |
| 2008/0004953 A1 | 1/2008 | Ma et al. | |
| 2008/0059521 A1 | 3/2008 | Hutson et al. | |
| 2008/0147488 A1 * | 6/2008 | Tunick et al. | 705/10 |
| 2008/0154671 A1 | 6/2008 | Delk | |
| 2008/0167992 A1 | 7/2008 | Kokernak et al. | |
| 2008/0183560 A1 | 7/2008 | Kaplan et al. | |
| 2008/0183575 A1 | 7/2008 | Kaplan et al. | 705/14 |
| 2008/0189168 A1 | 8/2008 | Kaplan et al. | |
| 2008/0255915 A1 | 10/2008 | Collins et al. | |
| 2009/0048908 A1 | 2/2009 | Kaplan et al. | 705/10 |
| 2009/0142038 A1 | 6/2009 | Nishikawa | 386/109 |
| 2010/0106597 A1 | 4/2010 | Jayakody | 705/14.53 |

OTHER PUBLICATIONS

Final Office Action in U.S. Appl. No. 12/257,161, issued Feb. 8, 2012.

Final Office Action issued for U.S. Appl. No. 12/257,161, mailed on Mar. 3, 2015.

* cited by examiner

BACK-CHANNEL MEDIA DELIVERY SYSTEM

RELATED APPLICATION DATA

This application claims priority to U.S. Provisional Patent Application Ser. No. 60/898,855, entitled BACK-CHANNEL MEDIA DELIVERY SYSTEM, filed Jan. 31, 2007, which applications are incorporated herein by reference.

TECHNICAL FIELD

The present invention relates to techniques for rendering media content on a media delivery device that tracks human impressions of the media content, as well as other environmental data, during the time it was rendered by the media delivery device.

BACKGROUND OF THE INVENTION

It has always been difficult for advertisers to gauge the effectiveness of their advertisements particularly where the advertising is done through traditional modes of advertising such as television or newspaper. Generally speaking, television networks and newspaper publishers have only approximate statistics on the number of viewers or readers within a given market. Newspaper publishers, for example, can approximate the number of newspapers that are read on any given day based on subscription and other sales data. Of course, every person who receives a newspaper is not going to read every advertisement within that paper. Consequently, newspaper publishers and those who purchase advertisements from the publishers have only a loose idea of how many people are exposed to or actually read their advertisements. Likewise with television advertising, the viewership of any given program, and the commercials that run during such programs, is not known with precision. The so-called 'ratings' for television programs are gathered statistically and again, calculating the number of people who are reached with any given advertisement is imprecise. Ideally, advertisers would like more substantive feedback about who and how their advertising content is being viewed.

With the rise of Internet advertising, advertisers are given more direct and immediate feedback on who is viewing their advertisements. Suppose, for example, that an advertiser purchases advertisements on the website of a major internet search engine such as Google. The advertisement provider, Google in this case, gathers data on the precise number of times that a given advertisement is actually rendered during a page view. Likewise, the advertisement provider can gather data representing the precise number of times a given advertisement is actually clicked by the viewer of the advertisement. Such feedback is invaluable because it allows advertisers to get feedback on the exact, rather than approximate, number of impressions the advertising made on the target audience. An 'impression' is any exposure a person has to an advertisement. In the context of a newspaper, an advertisement has an impression every time a person turns to the page of the paper where the advertisement is located. Since it is not possible to know with any certainty what pages of a newspaper are every actually viewed by a person, it is not possible to know with any certainty how many impressions a newspaper-based advertisement receives. A similar problem exists with television advertising because, as was discussed above, television 'ratings' are statistical estimates and calculating the number of people reached with any given advertisement is imprecise.

In addition to impression information, the feedback provided by an internet advertisement provider such as Google also provides valuable information about how effective an internet-based advertisement is in generating an inquiry (i.e. it tells you how many impressions actually result in a click on the advertisement). Data generated by, and fed back from, an advertising channel is more commonly known as 'back-channel data.' Back-channel data has increasingly become the currency driving Internet advertising business. Absolute measurement—vs. statistical analysis—is key to advertisers, corporate and content programmer confidence.

Although television, newspaper and magazine advertising channels continue to be very important, other forms of advertising such as audio, video and electronic signage in retail spaces, hotels, restaurants and other public places are becoming increasingly prevalent. Such advertising media might comprise playback of DVD's, computer generated media or animation, set-top box video and audio, satellite dish video, streaming internet protocol television ('IPTV'), still pictures, or even audio. Some such systems have the capability to report on what media content was played at what time and to schedule the time at which particular media is played. While these are very valuable controls for advertisers who wish to control their messaging, there is currently no mechanism for reporting how many people were or are exposed to an impression of such media content. Likewise, there is no mechanism for adapting the media content to account for local variables and conditions detected during media playback.

There is therefore a need for an media delivery system that gathers data about the number and type of human impressions of media content delivered by a content rendering device for cross-correlation of such impression data with the media content. Such a system may also alter the media content it delivers based on such data.

DETAILED DESCRIPTION OF EMBODIMENTS OF THE INVENTION

Techniques are described below for consolidating and correlating information about media content that is rendered at a specific time by a set-top box coupled to a display with information about the number of impressions the content made on people within some detectable proximity of the display. Although described in terms of a set-top box and display, it should be understood that such media rendering and display devices, as well as other related components, are only exemplary. Other types of media, such as still pictures or audio, may also be rendered by embodiments of the invention by an appropriate display or playback device and information about the number and type of impressions of such content likewise collected, consolidated and correlated. In particular, although embodiments of the invention are described in terms of a set-top box, it will be understood that any computing device or devices capable of performing the disclosed functions of the set-top box will suffice and in no way does such a device or devices need to be literally on top of a television set. Likewise, although the media delivery system has been described in terms of advertising and advertising media, embodiments of the invention are not so limited. Embodiments of the invention may, therefore, render media that is not specifically advertising related.

Figure 1A:
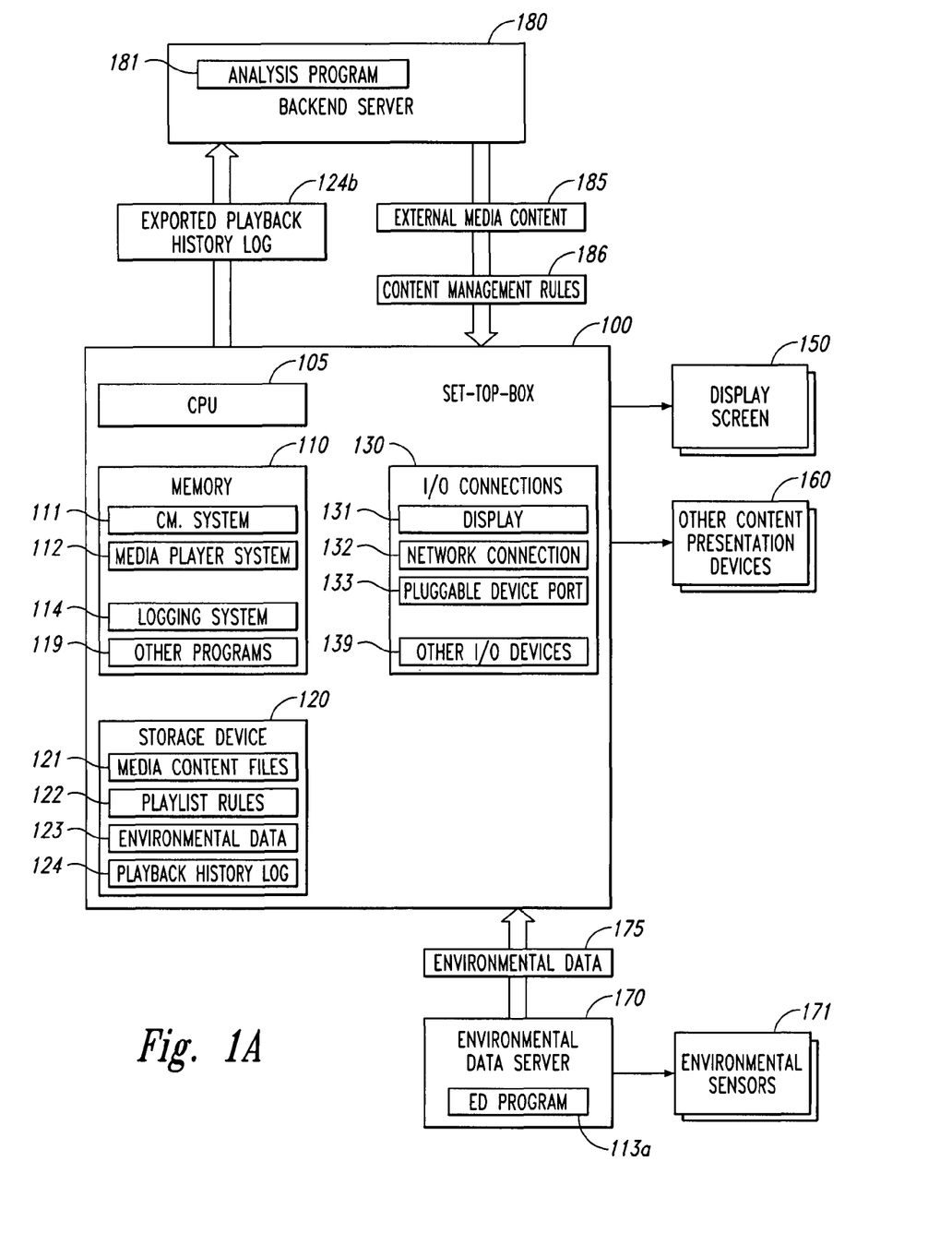
FIGS. 1A and 1B are detailed block diagrams of example embodiments of back-channel media delivery systems.

FIG. 1A depicts a back-channel media delivery system according to one embodiment of the invention. The system includes a set-top box 100, a display 150, environmental sensors 171, an environmental data server 170 and a backend server 180. The set-top box 100 includes, among other things, a content management system 111, a media player system 112 and a logging system 114. Although discussed in terms of such components and programs, alternative embodiments of the invention are possible and it will be understood that the embodiments discussed below are for illustrative purposes only. In an alternative embodiment, the set-top box 100 may, for example, include only the content management system 111 and the logging system 114 whereas the media player system 112 is physically separate from the set-top box 100. Indeed, any of the functions of the content management system 111, the media player 112 and the logging system 114 may be performed by devices or systems that are physically separate.

The media player system 112, along with the display 150, or other content presentation devices 160, are used to render instances of media content that embody and convey the message intended for the audience. As will be discussed more fully below, media content 121 stored in storage device 120 is selected by the content management system 111 for playback and is processed and rendered on the display 150, or other content presentations devices 160, by the media player system 112. Examples of storage devices 120 include hard drives, flash memory, remote server, network attachable storage and other types of non-volatile storage and memory devices. Typically, the media content 121 is rendered as digital or analog signals which are routed to input/output (I/O) connections 130 on the set-top box 100. For example, in the case of video media, video signals are routed to the display I/O connection 130. Other types of media, such as audio or pictures, may be routed to other devices through their respective connectors 139. The I/O connections 130 further include a network I/O connection 132 for routing signals between the set-top box 100 and a network. The network I/O connection 132 might be comprised of, for example, a modem connection or an 802.11x WiFi connection. A pluggable device port I/O connection 133 can be used to connect the set-top box 100 to a pluggable device, as will be described in more detail below.

The output signals are then electronically transferred from these I/O connectors 130 to an appropriate device, for example, from the display I/O connection to the display 150 or from the I/O connectors 139 to some other media content presentation device 160. In at least some embodiments, the output and input connectors follow A/V industry standard formats (e.g., Component, Composite, VGA, DVI, and HDMI). Such embodiments of the set-top box can process and render, for example, at least one of the following digital media formats using an associated CODEC: MP3, MPEG2, MPEG4, AVI and Windows Media files such as WMA (for audio) and WMV (for video). It will be understood that these digital media formats are only for illustrative purposes and other types of media might be rendered by the media player system 112.

The back-channel media delivery system also includes environmental sensors 171. These sensors are responsible for detecting a myriad of environmental states, signals and conditions indicative of a human impression of the media content rendered by the media player system 112. In the embodiment of FIG. 1A, one or more sensors 171 are configured to count foot-traffic in the vicinity of the back-channel media delivery system and these sensors are connected to an environmental data server 170. In one embodiment, the count of foot-traffic corresponds to the count of impressions. As will be discussed more fully below, the count of impressions is stored and can be used with playlist rules or for post-processing. The sensors 171 may be connected through, for example, a wired connection, which includes an Ethernet, RS-232 serial, USB or modem connection, or they may connect wirelessly through, for example, an 802.11x Wi-Fi network, or a Bluetooth or Infra-Red connection. An environmental data program 113a is executed on the data server 170 and processes the signals received by the environmental data server 170 from the sensors 171. The environmental data program 113a can use various parameterized algorithms to determine whether the sensors 171 have detected a valid impression. The Environmental data 175, which includes the number of valid impressions, is transmitted to the set-top box 100 for further processing and, as will be discussed in more detail below, for use by content management system 111. In at least some embodiments, in addition to being used for counting the number of impressions, the environmental sensors 171 are capable of capturing "dwell time" of a person in an area in the vicinity of the back-channel media delivery system. Dwell time is a measure of how long the person or persons remained in proximity of the sensors 171 or back-channel media delivery system. That is, in these embodiments the sensors 171 are capable of determining when a person is in proximity to the back-channel media delivery system 100, and additionally, determining how long they stay in proximity.

The number of valid impressions and other environmental data is transmitted to the set-top box 100 via an I/O connection 130 such as, for example, the network connection 132 or through the pluggable device port 133. Some examples of sensor types include, but are not limited to, thermal imaging camera sensors, infrared sensors, pressure sensors, video imaging camera sensors, sonar sensors, laser sensors, audio sensors, motion sensors and RFID tag sensors. In some embodiments, the environmental sensors 171 are integrated into or attached to the display device 150, and in other embodiments, the sensors 171 are be integrated into or attached to the set-top box 100 itself. In other embodiments, the environmental sensors 171 may be installed anywhere within a suitable vicinity of the display device 150. For example, on the wall, ceiling or floor, within windows or doors, or self-contained and free standing.

The environmental data 175 is processed by the logging system 114 executing on the set-top box 100. The data is stored in the storage 120 temporarily or permanently on the set-top box as environmental data 123. In one embodiment, the media player system 112 communicates with the logging system 114 via an inter-process-communication mechanism, either in a event-driven or polling fashion, to provide playback information, such as playback state and metadata, of the media content the media player system 112 is rendering. The logger program 114 aggregates and correlates the media playback information, duration of the media content, and a timestamp of when the media content was rendered together with the environmental data 123. The resulting output of the logging system 114 is a playback history log file 124.

As was discussed above, the environmental data server 170 may process the signals received from the sensors to determine whether the sensors 171 have detected a valid impression. In an embodiment, such processing is done in real-time whereby the number of impressions is determined by the environmental data server 170 as sensor data is received from the sensors 171. In another embodiment, the sensor data and signals may be queued by the environmental data server 170 for processing at a later time. For example, after normal business hours when sensor data is not being gathered by the back-channel media delivery system (because, e.g., the store is closed), the system is relatively idle and the CPU cycles of the system may be advantageously utilized during this time. Likewise, the processing needs of the system are reduced during peak periods of environmental data gathering because the system is tasked only with storing the signals and data from the sensors 171 and not with also processing such data at that time. Such an embodiment may permit the back-channel media delivery system to use less expensive hardware since the peak processing load on the system is lower.

In an embodiment, the environmental data server 170 may be configured to detect and log environmental data that is erroneous or fraudulent. It is generally desirable that embodiments of a back-channel media delivery system gather accurate information regarding the number of impressions. In certain environments, the system may log impressions that should not be counted. For example, when placing an embodiment of the back-channel media delivery system in a store, impressions made by store employees generally should not be counted. In an embodiment, the environmental data server 170 may be configured to identify particular individuals based on various environmental data and to exclude impression counts for such persons. In an embodiment, the environmental data server 170 may work in conjunction with one or more sensors 171 that detect the presence of persons who should not be counted when gather impression data. Such sensors could, for example, detect an RFID tag embedded in the employee's name badge. Other sensors are possible as is discussed below and detection of an RFID tag is exemplary only.

In other cases, persons may wish to intentionally deceive an embodiment of the back-channel media delivery system into logging impressions that are not, in fact, valid. For example, a competitor of an advertiser may wish to trick the system into logging so many impressions or otherwise flooding the system with false data, that the advertiser is incapable of gathering any useful information about the effectiveness of their advertising. In one embodiment, the environmental data server 170 may be configured to algorithmically detect possible fraudulent impressions. For example, the environmental data server 170 may use a smoothing or filtering algorithm to remove large spikes in traffic when they may indicate attempts are being made to deceive the system.

In other embodiments, the back-channel media delivery system collects and logs data that can be accessed by a user and auditors. This may be desirable for an external auditor to confirm that the data sensed and collected by the system is accurate. An example of gathering audit data includes capturing and storing a photograph every 30 seconds that can be compared with foot-traffic counts obtained using a video camera environmental sensor 171 to confirm that the video sensing technology accurately counts foot-traffic. Other techniques of gathering audit data for verification of data collected by the back-channel media delivery system can be used as well.

Although a back-channel media delivery system will typically detect and log valid impressions of delivered media, embodiments of the back-channel media delivery system may also use non-automated counting mechanisms. In one such embodiment, the sensors 171 could include a video camera of the vicinity of the back-channel media delivery system and the video footage of that camera could be routed to actual humans who watch the video and manually count the number of impressions on the system.

As previously discussed, instances of media rendered by the back-channel media delivery system may include a variety of different types of media such as video, audio or still pictures. In one embodiment, such media is managed by the content management system 111 which is part of the set-top box 100. The content management system 111 enables a user to define playlist rules 122 that govern what media content 121 is to be loaded onto the storage 120 of the set-top box 100 for playback as well as for defining playlist rules that govern when or how often instances of media content are to be rendered on the display device 150 or other content presentation devices 160.

In some embodiments, the playlist rules that govern the playback of media content, along with the media content files, are transferred onto the set-top box 100 from an external location such as another networked computing device commonly known as the backend server 180. In other embodiments, where network connectivity is not available, such rules and media content may be transferred from an external data store onto a removable memory storage device (not shown) (e.g., a Universal Serial Bus (USB) flash memory drive), and then transferred from the removable memory storage device onto the set-top box 100 by connecting the removable memory storage device to a compatible I/O connection 130 on the set-top box 100, for example, a USB port. Although discussed in terms of a USB flash drive, other modes of transferring playlist rules and media content are possible. For example, other forms of portable, non-volatile storage such as DVDs, CDs, tape or floppy disk or Memory Cards such as Compact Flash, Secure Digital Card, MultiMedia Card, SmartMedia, Memory Stick, Memory Stick PRO, xD-Picture Card or a Micro Drive might be used instead. In alternative embodiments where Internet connectivity is not possible, the back-channel media delivery system communicates with the backend server 180 via a modem or other data connection.

Turning to the playlist rules, many different rules can be specified, with the number and type of rules related to the capabilities of the set-top box 100 and environmental sensors 171. An example of a simple playlist rule is one that is time based. For example, the content management system 111 can be instructed via a playlist rule to play a certain media selection according to the current time of day, day of the week, or a combination of the two. The rules can further specify a sequential, random or weighted randomization of media selections during a given time period. Different rules can be applied to different times of the day and on different days of the week. For example, supposing an embodiment of the invention were placed on a commuter train for playing advertisements or other media to commuters. In such a situation, the audience would be different during the rush hour commute than it would be, for example, at noon. Likewise, the audience on such a train would be different on the weekend than it would be during an ordinary mid-week work day. Playlist rules allow embodiments of the invention to be sensitive to these differences and enable an advertiser, for example, to tailor the selection and playback of media accordingly.

Another example of a playlist rule is one which specifies that the same media should not be repeated within a given period of time. In the commuter train example above, it is likely that almost the same audience would be on board the train from, for example, the suburbs into the city. Once the train has emptied at its destination, the playlist rules could permit the media selections to repeat because presumably, a new audience would be present to see the media content.

Playlist rules may also specify quotas for specific media with promotion or demotion of playback priority based on the number of impressions each media has received. For example, suppose a particular advertisement, 'ad A', is targeted to receive 100 impressions in a month. Suppose that 'ad B' is targeted to receive only 50 impressions per month. Further suppose that 'ad B' has already received 40 impressions while 'ad A' has received only 30. The content management system 111 may, in such a situation, boost the priority of 'ad A' so that it plays more frequently and likewise decrease the play priority of 'ad B' so it plays less frequently. In this way, the back-channel media delivery system can increase the likelihood that each advertisement will receive its targeted number of impressions. The play priority for any given piece of media may also be specified based on a premium service where advertisers, for example, pay a premium for more impressions or for playback priority.

In other embodiments, media can receive a higher playback priority because of its particular perishability. That is, certain media content is particularly time sensitive and in recognition of this, such media will receive a higher playback priority to hopefully increase the number of impressions. Examples of such media could involve sporting events (e.g., the Super Bowl), the season finale of a popular television show or media content related to an election.

More complex playlist rules can be used by the content management system 111 in conjunction with environmental data 123 provided by the environmental sensors 171. In one embodiment, the environmental sensors 171 act as traffic counters that simply count the number of persons passing in proximity to the back-channel media delivery system. The traffic count is provided as feedback to the back-channel media delivery system as was previously discussed. According to a particular rule, the content management system 111 may then prioritize the playback of specific media items or groups of media for playback during times of high traffic. It can also be specified in the playlist rules that the same media should not be played back-to-back. The playlist rules can also be used to have the content management system 111 prioritize specific media items or a group of media items to playback when the system senses a high traffic-count. A high-traffic count might be characterized in different ways. For example, the content management system 111 might consider passing a certain traffic-count threshold as "high-traffic." Alternatively, the content management system 111 could characterize a large change in traffic within a certain period of time as high traffic and ignore the raw number of traffic counts altogether.

Although traffic counting sensors are perhaps the most common type of environmental sensors 171, more sophisticated sensors are capable of sensing and measuring more complex data for use with more complex playlist rules and data gathering. For example, as previously discussed, some sensors are capable of measuring the dwell time of a person or persons within a proximity of the back-channel media delivery system. Such capability is useful for helping determine the efficacy of any given advertisement. For example, it is advantageous to know that while 'ad A' was watched by 10 persons, only 2 of them stay for the entire 30 second duration of the advertisement. This data is valuable if you also know that 'ad B' was also watched by 10 persons and 8 of them stayed for the entire 30 second duration of the advertisement. The simplest sensors would detect only proximity and determine how long a person or persons are in proximity to the back-channel media delivery system.

Another type of sensor could read the information stored in an RFID tag. Such a tag might be placed in products sold in a store. In one embodiment, the sensors in a back-channel media delivery system could determine what the quantity and type of products a person has in their shopping cart as they approach the system in a retail store. Such data could then be used to select media for playback that is tailored for that particular person and their buying habits. Alternatively, RFID tags could be placed in the name tags of persons attending a large convention. The RFID tag could store information about that particular persons area of expertise. The RFID tag could then be read as the person moves about the convention and media content that would be of interest to such a person could be adaptively rendered by a back-channel media delivery system as they pass by.

In yet another embodiment, environmental sensors could possibly detect the height and weight of a person in proximity to the back-channel media delivery system. Such information might be particularly useful especially when coupled with other information. Perhaps, for example, the playlist rules can be used to have the sensors 171 interpret a shorter, lighter person in front of the system during after-school hours between 3 and 5 P.M. to be children. In such instances, the playlist rules can further control the content management system to render media content intended for children.

Embodiments of the invention might also include one or more environmental sensors capable of tracking the attention of persons in proximity to the back-channel media delivery system. There are many possible configurations of attention tracking sensors. Some attention tracking sensors, for example, can track the attention of a subject through the measurement or detection of aspects of the subject's face. One such attention tracking sensor might, for example, use a camera and suitable illumination to capture images of an area in proximity with the back-channel media delivery system. Suitable processing of the images could be used to determine the locations of people within the image and in particular, where those people are actually looking. Such processing could, for example, detect whether a person is looking at the screen based on, for example, the angle of their facial features within the captured images. As is known in the art, there are complex algorithms such as the mean shift algorithm that allow for face recognition and face tracking and such algorithms may be advantageously employed in an attention tracking sensor.

Alternatively, methods exist for attention tracking based on tracking only on the eyes. A suitable eye tracking algorithm may process the captured images in order to determine whether the subject's eyes are pointed at the back-channel media delivery system. Attention tracking using only the eyes may be advantageous in certain lighting situations or where the particular illumination results in accentuation of the eyes within the captured images. Attention tracking using both the eyes and other aspects of the face or head may be advantageous since although a person's face may be generally facing the back-channel media delivery system, they may not be looking directly at the system. Instead, for example, they may be looking at something behind or to the side of the system. Use of eye tracking may thus permit attention tracking sensors to be more accurate. An attention tracking sensor incorporated into the embodiment depicted in FIG. 1A would allow the back-channel media delivery system to determine whether each individual in the defined field is looking at the display 150 from moment to moment.

Attention tracking sensors would permit embodiments of the back-channel media delivery system to gather information on how long each individual looks at the screen. Gathering such information on a second-by-second basis permits gauging the effectiveness of a particular instance of media content, or different time segments within that instance, in getting and maintaining the attention of people. Likewise, through the use of an appropriate playlist rule, one embodiment of the back-channel media delivery system could dynamically alter rendering of media in response to changing interest in the media being rendered. For example, suppose a person is watching the display 150 of the embodiment depicted in FIG. 1A. An attention tracking environmental sensor connected to such an embodiment could detect that the person is no longer paying attention or has averted their gaze in some manner, and that information could cause the system to start rendering a different instance of media. Alternatively, other embodiments of the system might change the volume of sound, change the brightness of the display, or other parameters of media playback in an attempt to regain the person's attention.

An attention tracking environmental sensor could also permit more accurate determination of a person's size, shape, height or the speed with which they move. Such information could be used by embodiments of the invention to generate probabilistic demographic information. Such information is useful and valuable in and of itself. Such information might also, however, be used by a playlist rule within an embodiment of the invention to custom tailor a media selection suitable for the person mostly likely to be watching the display at that moment.

In an embodiment, attention tracking environmental sensors may be used with face recognition algorithms to identify one or more persons in proximity with the back-channel media delivery system. Identification of the person or persons might employ many different face recognition algorithms as is known in the art. In an embodiment, the system compares the face or facial feature data detected by the attention tracking environmental sensors to face or facial feature data stored in, for example a database of faces and features. The database may be pre-populated with face data of particular persons of interest. Alternatively, the system may cross-reference $3^{rd}$ party databases that contain face data. For example, the system could reference face data from the FBI's Ten Most Wanted list or face data of missing children from the Center for Missing Children. In this embodiment, the back-channel media delivery system may then also notify and assist local agencies when a person of interest is detected in the vicinity of the system. In addition to notification and assistance, the back-channel media delivery system may also be configured to raise a local alert by, for example, displaying the image of the person of interest on the screen (e.g., a missing child poster) and sounding an alarm.

Many types of environmental sensors must be properly, and perhaps continually, calibrated to provide accurate measurement. Embodiments of the invention may provide mechanisms for manual, automatic and/or continual calibration of the environmental sensors. For example, an embodiment of a back-channel media delivery system may initiate playback of a calibration tone periodically to calibrate an audio sensor within the system. Such a system with a video camera may, for example, be calibrated by having a calibration image within the field of view of the camera and initiating calibration procedures on the camera.

With further reference to FIG. 1A, although the set-top box 100 is capable of functioning more or less autonomously using playlist rules and environmental data, the set-top box 100 may also periodically synchronize with the backend server 180. The backend server 180 receives the playback history log file 124 and can also upload new media content 185 and playlist rules 186 to the set-top box 100. Alternatively, the set-top box may continually communicate with the backend server 180 allowing the playback history to be communicated to the backend server 180 in real-time. The playback history log file 124 may be reformatted and exported as some digitally transmittable format prior to being transmitted to the backend server 180. In some embodiments, the transmission makes use of HTTP over TCP/IP protocols between set-top box 100 and the backend server 180, which could be connected via an Ethernet network. The connection could also be wireless using an 802.11x Wi-Fi network, Bluetooth connectivity, Cellular connectivity, radio frequency, or some variation thereof. The transmitted playback history log file 124 is collected, stored, and analyzed on the backend server 180 and available for various reporting functionality as needed by the user of the system. The backend server 180 is able to support the simultaneous collection of playback history log file 124 from multiple set-top boxes 100. The playback history log files 124 are aggregated and processed by an analysis program 181 that executes on the backend server 180. The analysis program 181 generates reports, and can further allow users to interactively query and view the imported playback history log file 124 and aggregated information.

Figure 1B:
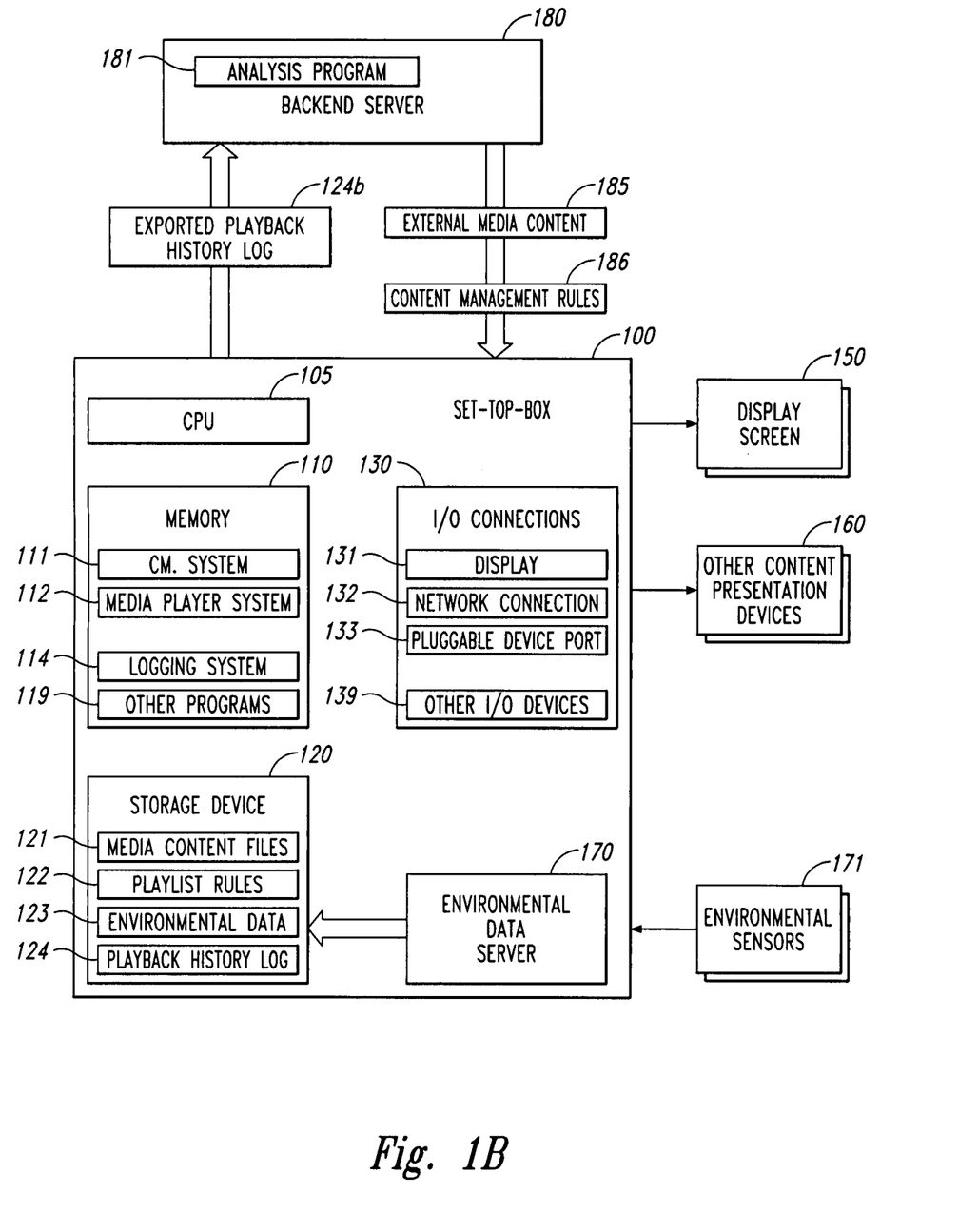

FIG. 1B depicts an embodiment of the back-channel media delivery system wherein the environmental data server 170 is integrated into the set-top box 100. Such an embodiment obviates the need for network connections between the environmental data server 170 and the set-top box 100 as well as the need for separate server hardware for the environmental data server. In some embodiments, the environmental sensors 171 are likewise directly connected to the set-top box 100. The functionality of these embodiments is otherwise identical to the embodiments discussed above.

Embodiments of the invention such as, for example, those pictured in FIGS. 1A and 1B may also incorporate mechanisms to detect and log error conditions that may arise within the system. One of more of the environmental sensors 171 may, for example, develop severe mechanical or electrical problems that require the attention of a repair technician. Alternatively, certain error conditions may arise that may be quickly remedied. For example, a video camera being used as an environmental sensor may detect insufficient light for proper recording. This could be due to low ambient lighting conditions or, for example, an obstruction place in or on the camera itself. Suitably programmed embodiments of the invention may log such errors and optionally transmit the log via the network, or other means, to a reporting station. Another embodiment may raise a local alert allowing personnel local to the system to effect a repair in some simple situations such as, for example, removal of the obstruction in front of the video camera environmental sensor as described above.

Embodiments of the invention may also incorporate a remote administration capability. An embodiment of a back-channel media delivery system will typically be located at a remote location such as a store or other public venue as discussed above. Costs associated with a technician making a service call to these locations may be considerable. To reduce or eliminate these costs, embodiments of the invention may be remotely monitored and administered. Such administration capability may include the ability to logon to the system through a network or other interface, examine and adjust system settings, monitor the environmental sensors and/or update playlist rules and media.

Figure 2A:
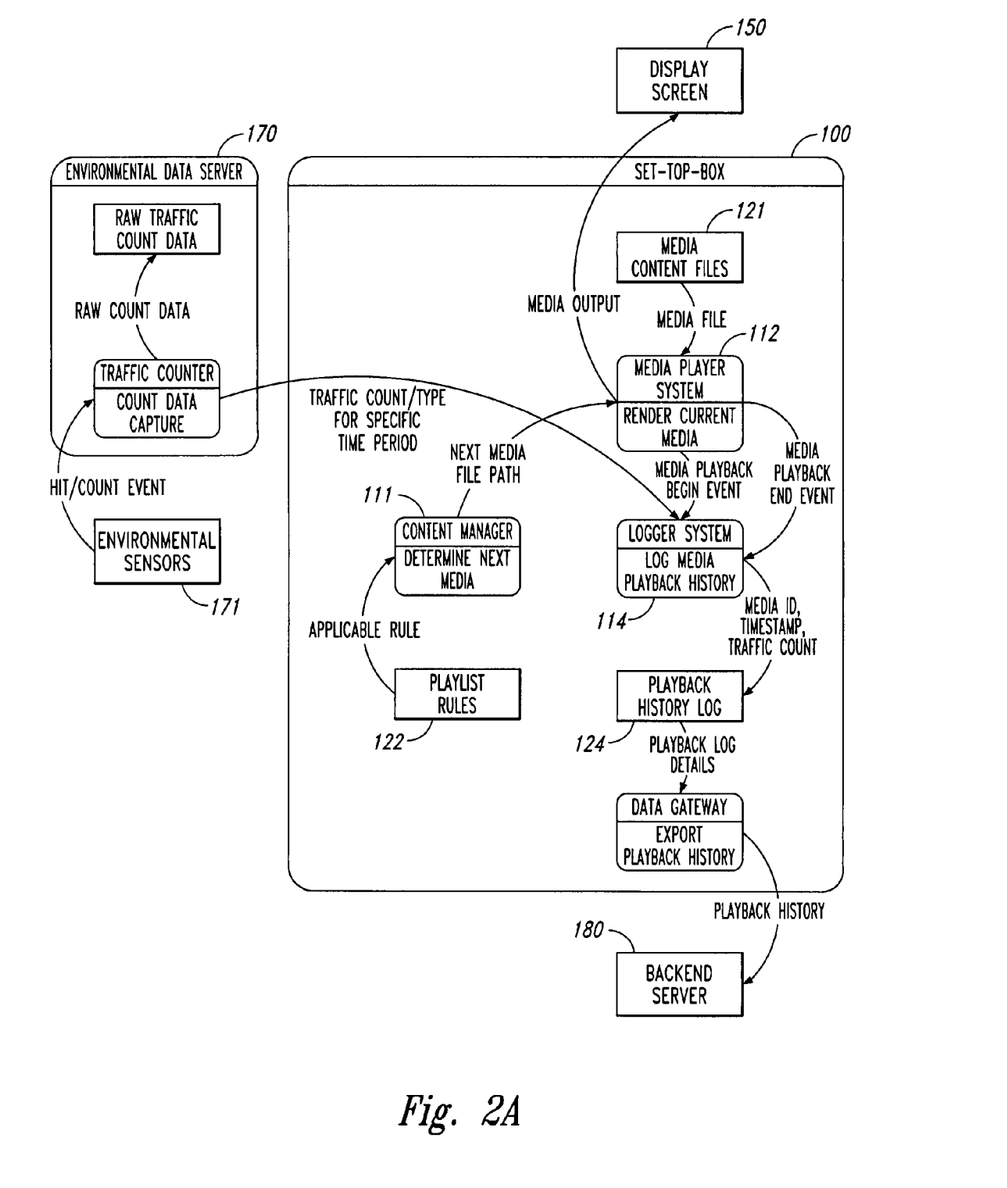
FIGS. 2A-2C are data flow diagrams of operation of example embodiments of back-channel media delivery systems.

FIG. 2A is a data flow diagram that describes the flow of data within the embodiment of system depicted in FIG. 1A above. Operation of this embodiment of the back-channel media delivery system typically begins with the content management system 111 determining the next media to render in accordance with the playlist rules 122. The content management system 111 communicates the location of the next media to the media player system 112. The media player system 112 retrieves the appropriate media file from the media content files 121 and then typically renders the media on, for example, the display screen 150. When the media player system 112 begins to render the media, it generates a media playback begin event which is communicated to the logger program 114. When the media player system 112 stops rendering that particular media, it generates a media playback end event that is also communicated to the logger program 114.

While the media is being rendered, the environmental sensors 171 begin detecting impressions and generate count events which are communicated to the environmental data server 170. The traffic count and type of traffic is passed from the environmental data server 170 to the logger program 114. During the period of time between the media playback begin event and end event, the logger program 114 logs the media ID, the timestamp and the traffic count and other environmental data to the playback log file 124. Periodically, the playback log will be exported to the backend server 180.

Figure 2B:
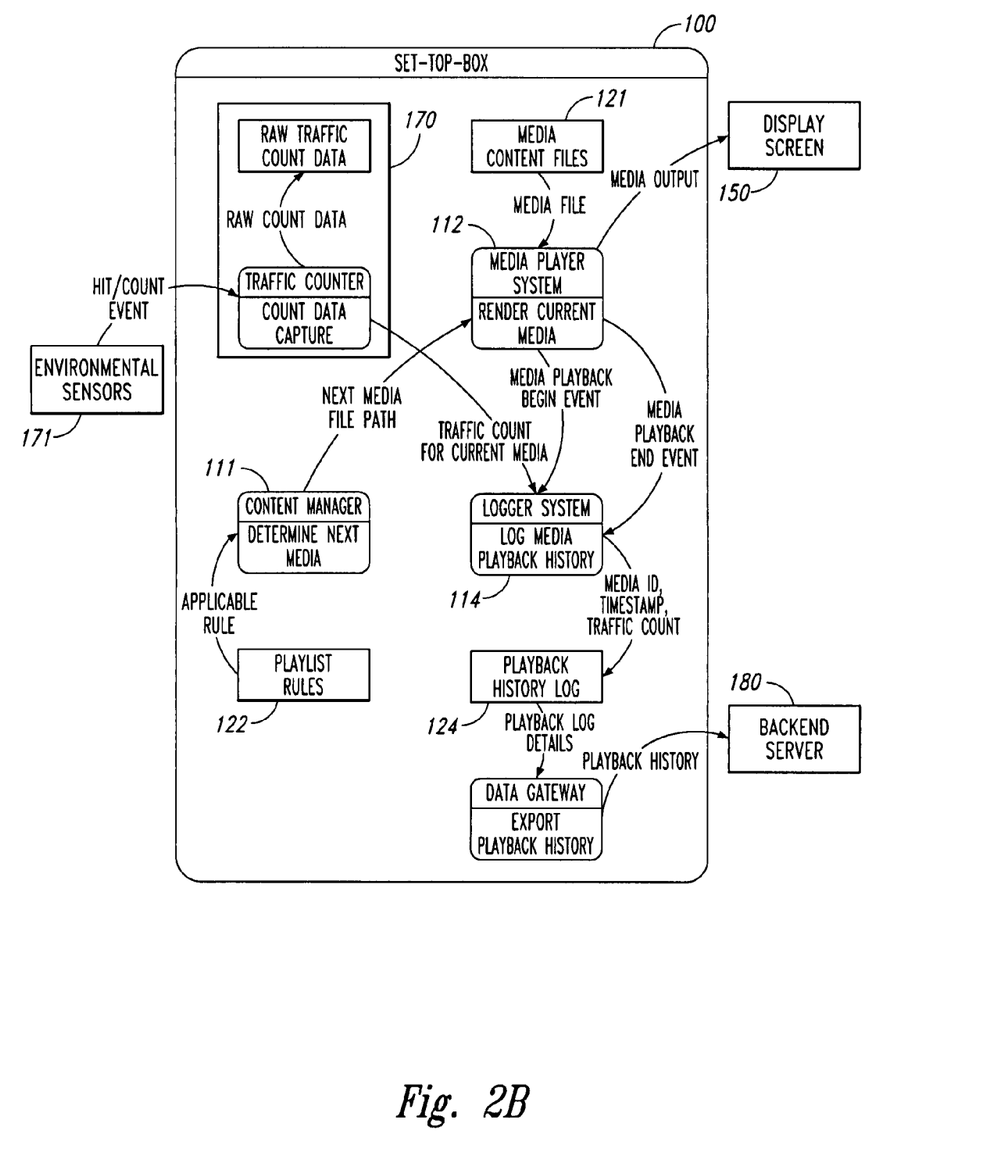

FIG. 2B is a data flow diagram that describes the flow of data within the embodiment of the system wherein the environmental data server 170 is integrated into the set-top box 100 and as depicted in FIG. 1B. The data flow shown in FIG. 2B is essentially the same as that of FIG. 2A except that the environmental sensors 171 communicate directly with set-top box 100 and its integrated environmental data server 170.

Figure 2C:
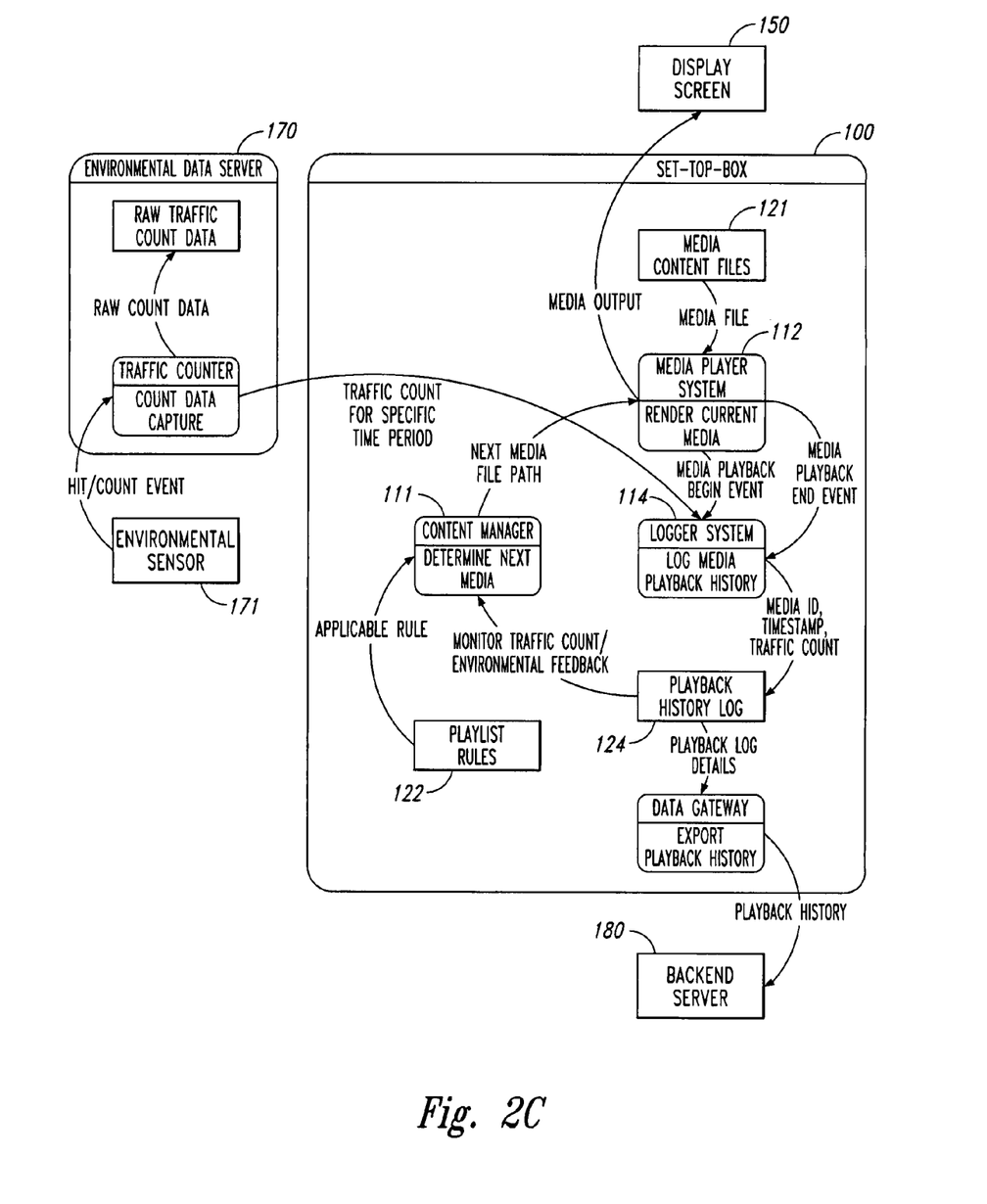

FIG. 2C is a data flow diagram of an example embodiment of a back-channel media delivery system where the collected environmental data is used as feedback to help determine the next media to play. During the time that the media player system 112 is rendering a media content file and the logger program 114 is likewise creating the playback history log 124, information about the traffic count and other environmental feedback is communicated back to the content management system 111. This feedback is used in conjunction with the playlist rules 122 to determine the next media content to render. The data flow depicted in this Figure is otherwise identical to that of FIG. 2A.

Figure 3:
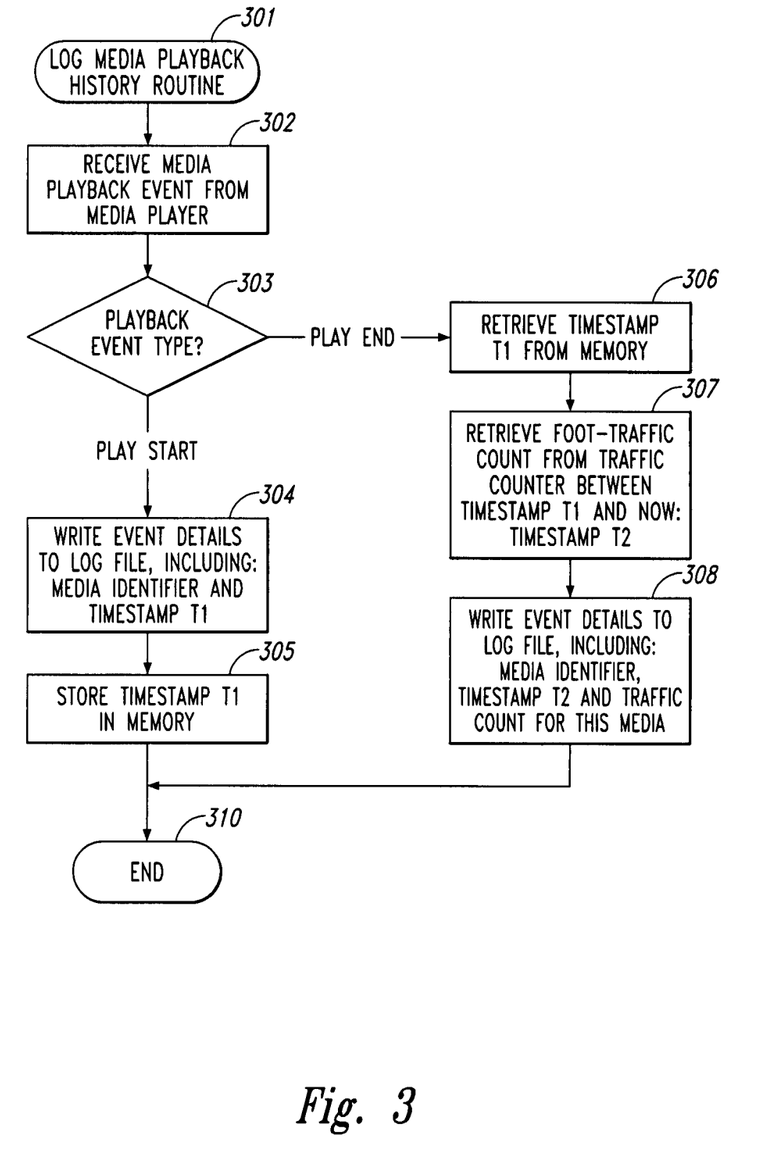
FIG. 3 is a flow diagram of an example embodiment of a routine for a logging system of a back-channel media delivery system.

FIG. 3 shows a flow chart diagram for one implementation of the log media playback history routine 301 of the logging system 114. A media playback event is received from the media player system 112 at step 302. The logging system 114 checks the playback event type at step 303. If the playback event type is a "Play Start" event, the event details are written to the log file at step 304, including the media identifier and timestamp T1 information. The timestamp T1 is stored in memory at step 305 for use later when a "Play End" event is received. The routine ends 310. If the playback event type is a "Play End" event, the timestamp T1 that was stored in memory is retrieved at step 306. Environmental sensor count data for the time interval between timestamp T1 and the current timestamp T2 is retrieved from the environmental data 123 at step 307. The event details are written to a playback history log file 124 at step 308 including the media identifier, the timestamp T2, and environmental sensor count data. Once the playback history log file 124 has been completed, it may be exported to the backend server 180 for further analysis.

Figure 4:
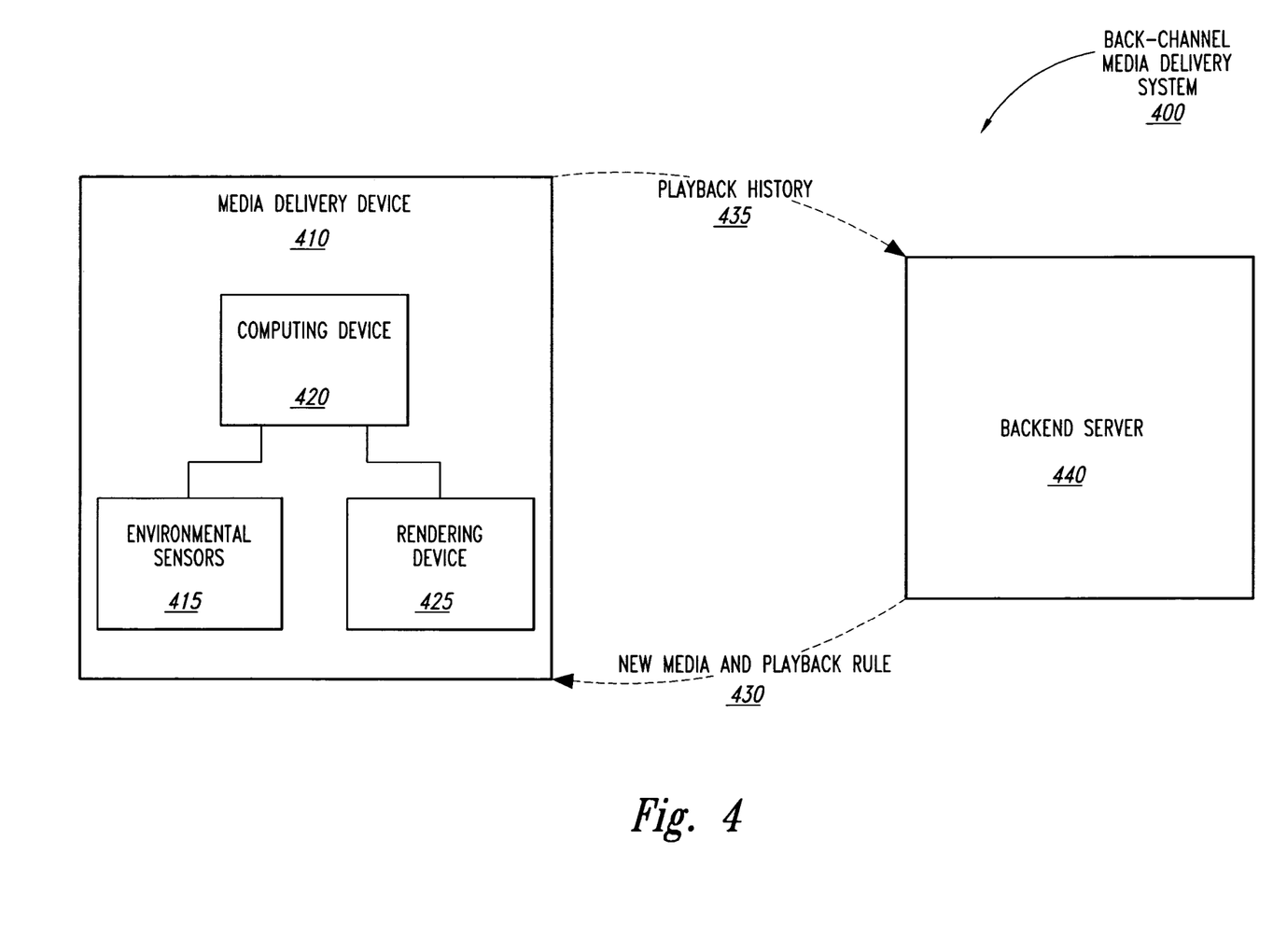
FIG. 4 is a high level block diagram of an example embodiment of a back-channel media delivery system.

FIG. 4 depicts a high level block diagram back-channel media delivery system according to one embodiment of the invention. Although FIG. 4 illustrates a particular embodiment, it will be understood that alternative embodiments are possible as is evident from the embodiments and variations described above. The back-channel media delivery system 400 includes a media delivery device 410 and a backend server 440. The media delivery device 410 includes a computing device 420. The media device 410 also includes environmental sensors 415 and a rendering device 425 coupled to the computing device 420. The computing device 420 selects media stored on the computing device 420 for rendering on the rendering device 425. Alternatively, the computing device 420 may select media stored elsewhere. The computing device 420 then renders the media on the rendering device 425. While rendering the media, the computing device 420 gathers environmental data from the environmental sensors 415. The computing device 420 compiles the playback history 435 and transmits this history that is received by the backend server 440. As was discussed more fully above, the backend server 440 is used to process and analyze the back-channel data. From this data, new playback rules may be devised for use by the media delivery device 410 during future renderings of new media on the rendering device 425. New media and playback rules 430 are then transmitted to the media delivery device 410. It will be understood that receiving the playback history 435 by the backend server 440 and sending the new media and playback rules 430 to the media delivery device 410 may be accomplished in numerous ways. For example, and as was discussed more fully above, the communication may take place via various types of wired or wireless connections or via non-volatile media.

From the foregoing it will be appreciated that, although specific embodiments of the invention have been described herein for purposes of illustration, it will be understood by one skilled in the art that various modifications may be made without deviating from the invention. Accordingly, the invention is not limited except as by the appended claims.

What is claimed is:
1. A media playback system comprising:
at least one rendering device;
at least one environmental sensor including an RFID sensor configured to detect RFID tags;
at least one environmental data server; and
a computing device including a storage device and coupled to the at least one rendering device, the at least one environmental data server, and the at least one environmental sensor, the computing device configured to:
select an instance of media stored in the storage device;
render the instance of media on the at least one rendering device; and
while rendering the instance of media, gather environmental data using the at least one environmental sensor to be provided to the environmental data server; and
wherein the environmental data server is configured to verify the environmental data and further configured to determine a number of instances RFID tags were detected and respective RFID tag identifiers, determine a number of the instances RFID tags were detected that are associated with the respective individuals who should not be included in the environmental data based on their respective RFID tag identifiers, and omit from the environmental data the number of instances RFID tags were detected associated with individuals who should not be included in the environmental data.
2. The media playback system of claim 1 wherein the environmental data server is further configured to verify the environmental data by at least one of:

detecting fraudulent environmental data, detecting invalid duplicate environmental data, and detecting environmental data corresponding to predetermined environmental data that should not be gathered.

3. The media playback system of claim 1 wherein the computing device is configured to provide the environmental data for manual inspection and the record of the environmental data is based on the inspection.

4. The media playback system of claim 1 wherein the computing device is further configured to cross-reference the environmental data with a database containing identity data for persons of interest.

5. The media playback system of claim 1 wherein the computing device is further configured to calibrate the at least one environmental sensor.

6. The media playback system of claim 1, wherein the computing device is further configured to gather audit data and store a record of the audit data.

7. The media playback system of claim 6 wherein the computing device is configured to gather audit data by capturing images of the vicinity of the at least one rendering device to confirm the environmental data gathered using the at least one environmental sensor.

8. The media playback system of claim 6 wherein the computing device is configured to provide the environmental data for manual inspection and the record of the environmental data is based on the inspection.

9. The media playback system of claim 6 wherein the computing device is further configured to cross-reference the environmental data with a database containing identity data for persons of interest.

10. The media playback system of claim 6 wherein the computing device is further configured to calibrate the at least one environmental sensor.

11. The media playback system of claim 1 wherein the computing device is further configured to detect and log system errors of the media playback system.

12. The media playback system of claim 11 wherein the computing device is configured to provide the environmental data for manual inspection and the record of the environmental data is based on the inspection.

13. The media playback system of claim 11 wherein the computing device is further configured to cross-reference the environmental data with a database containing identity data for persons of interest.

14. The media playback system of claim 11 wherein the computing device is further configured to calibrate the at least one environmental sensor.

15. The media playback system of claim 1 wherein the computing device is further configured to:
identify playback time information at which the instance of media was rendered;
provide the playback time information to a remote device; and
correlate the playback time information at which the instance of media was rendered with the environmental data.

16. The media playback system of claim 1 wherein the computing device is further configured to aggregate and correlate a rendering time at which the instance of media is rendered on the at least one rendering device and the environmental data is received from the environmental sensor during rendering of the instance of media.

17. The media playback system of claim 16 wherein the computing device logs at least one of an identification of rendered advertising media and the time at which the instance of media is rendered.

18. The media playback system of claim 16 wherein the computing device is physically separate from the at least one rendering device.

19. The media playback system of claim 16 wherein the at least one rendering device is further configured to provide the time at which instance of media is rendered.

20. The media playback system of claim 19 wherein the computing device includes a data logging system coupled to receive the time at which the instance of media is rendered and the environmental data to correlate the time of rendering with the environmental data.

21. The media playback system of claim 16 wherein the computing device comprises the environmental data server.

22. The media playback system of claim 16 wherein the environmental sensor is configured to sense at least one impression during rendering of the instance of media.

23. The media playback system of claim 22 wherein the at least one impression comprises at least one of tracking human impressions, impression dwell time, tracking attention, or length of time of attention.

24. The media playback system of claim 1, further comprising:
a data logging system configured to correlate a time at which the instance of media is rendered and the environmental data gathered during the rendering of the instance of media and generate log files, and
a server coupled to the at least one rendering device and the data logging system, the server configured to receive and analyze information in the log files to provide information related to playback of the instance of media.

25. The media playback system of claim 24 wherein the environmental data comprises at least one of tracking human impressions, impression dwell time, tracking attention, or length of time of attention.

26. The media playback system of claim 24 wherein the at least one rendering device is further configured to provide the data logging system the times at which the instance of media is rendered.

27. The media playback system of claim 24 wherein the server is further configured to provide rules for rendering the instance of media to the at least one rendering device.

28. The media playback system of claim 24 wherein the data logging system is further configured to synchronize with the server.

29. The media playback system of claim 24 wherein the at least one rendering device is a separate device from the computing device.

30. The media playback system of claim 24 wherein the server and the data logging system are separate devices.

31. The media playback system of claim 24 wherein the server is coupled to the computing device and configured to provide the environmental data to the data logging system.

32. The media playback system of claim 24 wherein the server and the computing device are separate devices.

* * * * *